US012589742B2

(12) United States Patent
Otis et al.

(10) Patent No.: US 12,589,742 B2
(45) Date of Patent: Mar. 31, 2026

(54) SYSTEMS AND METHODS FOR ADJUSTING A DRIVING PATH USING OCCLUDED REGIONS

(71) Applicant: Kodiak Robotics, Inc., Mountain View, CA (US)

(72) Inventors: Collin Otis, Driggs, ID (US); Philip C. Du Toit, Fort Collins, CO (US)

(73) Assignee: Kodiak Robotics, Inc., Mountain View, CA (US)

( * ) Notice: Subject to any disclaimer, the term of this patent is extended or adjusted under 35 U.S.C. 154(b) by 0 days.

(21) Appl. No.: 18/179,176

(22) Filed: Mar. 6, 2023

(65) Prior Publication Data

US 2024/0300487 A1    Sep. 12, 2024

(51) Int. Cl.
B60W 30/095 (2012.01)

(52) U.S. Cl.
CPC . B60W 30/0956 (2013.01); B60W 2554/4041 (2020.02); B60W 2556/40 (2020.02)

(58) Field of Classification Search
CPC ................. B60W 2554/4041; B60W 2556/40
See application file for complete search history.

(56) References Cited

U.S. PATENT DOCUMENTS

| | | | | |
|---|---|---|---|---|
| 9,428,187 | B2 * | 8/2016 | Lee | B60W 30/12 |
| 9,718,466 | B2 * | 8/2017 | Kim | G05D 1/0246 |
| 10,783,381 | B2 * | 9/2020 | Yu | G08G 1/167 |
| 10,807,599 | B2 * | 10/2020 | Zhu | G08G 1/096775 |
| 11,079,753 | B1 | 8/2021 | Roy | |
| 11,126,180 | B1 | 9/2021 | Kobilarov | |
| 11,127,294 | B2 | 9/2021 | Kim | |
| 11,188,082 | B2 | 11/2021 | Silva et al. | |
| 11,513,519 | B1 | 11/2022 | Akella et al. | |
| 12,055,945 | B2 | 8/2024 | Becker | |
| 2007/0030212 | A1 | 2/2007 | Shibata | |
| 2008/0027591 | A1 | 1/2008 | Lenser et al. | |
| 2009/0140881 | A1 | 6/2009 | Sakai et al. | |
| 2009/0237269 | A1 | 9/2009 | Okugi et al. | |
| 2011/0102195 | A1 | 5/2011 | Kushi et al. | |
| 2012/0218125 | A1 | 8/2012 | Demirdjian et al. | |
| 2013/0223686 | A1 | 8/2013 | Shimizu et al. | |

(Continued)

OTHER PUBLICATIONS

M.-Y. Yu, R. Vasudevan and M. Johnson-Roberson, "Occlusion-Aware Risk Assessment for Autonomous Driving in Urban Environments," in IEEE Robotics and Automation Letters, vol. 4, No. 2, pp. 2235-2241, Apr. 2019, doi: (Year: 2019).*

(Continued)

*Primary Examiner* — Gertrude Arthur Jeanglaude
(74) *Attorney, Agent, or Firm* — Fox Rothschild LLP

(57)    ABSTRACT

Exemplary embodiments include methods and systems to adjust a driving path in a planner-map, including: identifying a driving surface; determining a path on the driving surface; identifying one or more objects relative to the driving surface using one or more sensors; detecting one or more occlusion areas from sensor data from the one or more sensors; tracking one or more tracks of one or more objects within the one or more occlusion areas; adding uncertainty to the one or more tracks within the one or more occlusion areas; and adjusting the path on the driving surface based on the uncertainty of the one or more tracks within the one or more occlusion areas.

16 Claims, 7 Drawing Sheets

(56)                      References Cited

U.S. PATENT DOCUMENTS

| | | | |
|---|---|---|---|
| 2018/0233049 | A1 | 8/2018 | Ishii et al. |
| 2019/0049992 | A1 | 2/2019 | Riess et al. |
| 2019/0329768 | A1 | 10/2019 | Shalev-Shwartz et al. |
| 2020/0103523 | A1 | 4/2020 | Liu et al. |
| 2020/0189467 | A1 | 6/2020 | Kondo et al. |
| 2020/0225669 | A1 | 7/2020 | Silva et al. |
| 2020/0264622 | A1 | 8/2020 | Tokumochi |
| 2020/0278681 | A1 | 9/2020 | Gier et al. |
| 2020/0377092 | A1 | 12/2020 | Torres et al. |
| 2021/0018908 | A1 | 1/2021 | Tokuda et al. |
| 2021/0027629 | A1 | 1/2021 | Tao et al. |
| 2021/0197811 | A1 | 7/2021 | Tsushima et al. |
| 2022/0185267 | A1 | 6/2022 | Beller et al. |
| 2022/0242403 | A1 | 8/2022 | Horita et al. |
| 2022/0262128 | A1 | 8/2022 | Nakamura |
| 2022/0300748 | A1 | 9/2022 | Tokmakov et al. |
| 2022/0315051 | A1 | 10/2022 | Patel et al. |
| 2022/0383749 | A1 | 12/2022 | Ishikawa et al. |
| 2023/0195830 | A1 | 6/2023 | Raina et al. |
| 2023/0332919 | A1 | 10/2023 | Mehdi et al. |
| 2024/0300486 | A1 | 9/2024 | Otis et al. |
| 2024/0300533 | A1 | 9/2024 | Otis et al. |

OTHER PUBLICATIONS

Ess, A. et al., "Object Detection and Tracking for Autonomous Navigation in Dynamic Environments," The International Journal of Robotics Research (2010); 29(14): pp. 1707-1725.

International Search Report issued on Oct. 11, 2024 for International Patent Application No. PCT/US2024/018516 (5 pages).

Yu, M. Y. et al., "Occlusion-Aware Risk Assessment for Autonomous Driving in Urban Environments," IEEE Robotics and Automation Letters (2019); 4(2): pp. 2235-2241.

* cited by examiner

SYSTEMS AND METHODS FOR ADJUSTING A DRIVING PATH USING OCCLUDED REGIONS

BACKGROUND

Field of the Disclosure

Embodiments of the present disclosure relate to object tracking and, in particular, to tracking objects through occluded regions.

Description of the Related Art

To safely and efficiently navigate an environment and prevent possible collision, self-driving or otherwise autonomous vehicles (AVs) require the ability to detect one or more objects, obstacles, and/or road surface conditions within an environment of the AV. However, for moving objects, in order to safely navigate, the objects not only need to be detected, but they also need to be tracked in order to maintain knowledge of a position of the moving objects.

Occlusion occurs when there is a track on an object, but then the vehicle loses site of the track at some point. Eventually, as a vehicle moves, many objects may become occluded. For example, objects may drop behind another object, move into or out of the AV's field of view, or may be lost around a bend, etc. Occlusion can also be caused by the vehicle itself. For example, if the vehicle cuts a corner, it may not be possible to see objects low on the ground on the corner. In these instances, the vehicle itself may occlude objects that were previously tracked.

When an object is occluded, the object does not disappear. This means that the object could still pose a risk to the vehicle in the future. Therefore, for at least these reasons, systems and methods for tracking objects through occluded regions is needed to safely and efficiently navigate an environment and prevent possible collision.

SUMMARY

Exemplary embodiments include a method to adjust a driving path in a planner-map, comprising: identifying a driving surface; determining a path on the driving surface; identifying one or more objects relative to the driving surface using one or more sensors; detecting one or more occlusion areas from sensor data from the one or more sensors; tracking one or more tracks of one or more objects within the one or more occlusion areas; adding uncertainty to the one or more tracks within the one or more occlusion areas; and adjusting the path on the driving surface based on the uncertainty of the one or more tracks within the one or more occlusion areas.

In an exemplary embodiment, the uncertainty may be managed in different ways. For example, the uncertainty of the one or more tracks is based on a time elapse of an object corresponding to the track that is within the one or more occlusion areas. For example, the uncertainty of the one or more tracks increases as time elapses. For example, the uncertainty is based on a size of the one or more occlusion areas. For example, the uncertainty increases with the size of the one or more occlusion areas.

In an exemplary embodiment, the method may also include adjusting the path based on the one or more tracks within the one or more occlusion areas.

In an exemplary embodiment, a system may adjust a path, including: a planner-map configured to identify a driving surface and determine a path on the driving surface; one or more sensors configured to generate sensor data to identify one or more objects relative to the driving surface; an occlusion publisher configured to detect one or more occlusion areas from the sensor data from the one or more sensors; a tracker configured to track one or more tracks of one or more objects within the one or more occlusion areas, wherein the planner-map is configured to add uncertainty of the one or more tracks of one or more objects within the one or more occlusion areas, and adjust the path on the driving surface based on the uncertainty of the one or more tracks within the one or more occlusion areas.

The system may include any combination of additional components and functions. For example, the planner-map is configured to add the uncertainty of the one or more tracks based on a time elapse of an object corresponding to the track that is within the one or more occlusion areas. For example, the planner-map is configured to increase the uncertainty of the one or more tracks as time elapses. For example, the planner-map is configured to add the uncertainty based on a size of the one or more occlusion areas. For example, the planner-map is configured to increase the uncertainty with the size of the one or more occlusion areas. For example, the planner-map is configured to adjust the path based on the one or more tracks within the one or more occlusion areas.

In an exemplary embodiment, the planner-map, occlusion publisher, and tracker comprise one or more processors having non-transitory machine readable instructions stored in one or more memory locations that is configured to perform functions when executed by the one or more processors.

In an exemplary embodiment, a method may adjust a driving path in a planner-map, including identifying a driving surface; determining a path on the driving surface; identifying one or more objects relative to the driving surface using one or more sensors; determining one or more occlusion areas created by the one or more objects; adding uncertainty of a potential additional object within the one or more occlusion areas; adjusting the path on the driving surface based on the uncertainty of the potential additional object within the one or more occlusion areas.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
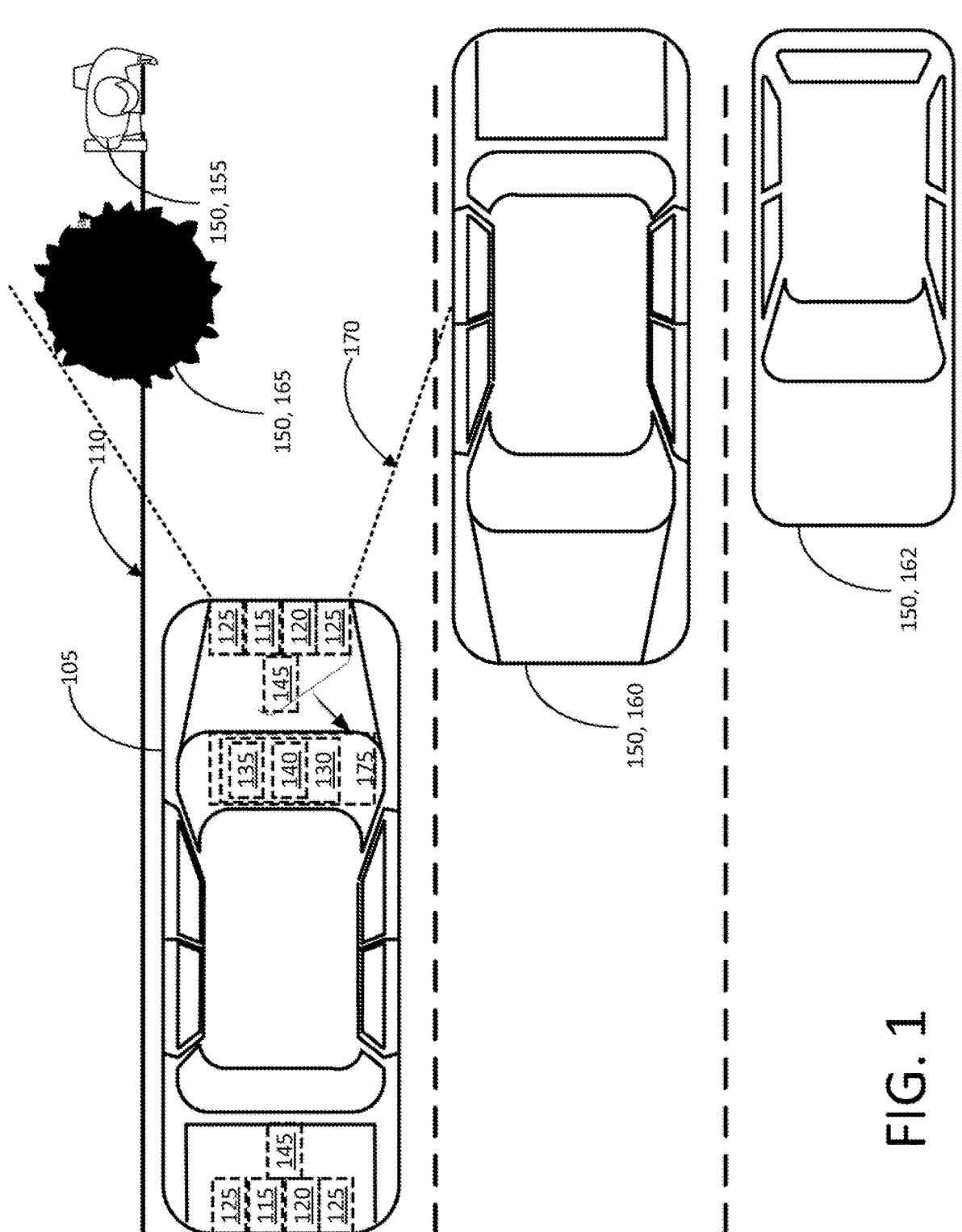
FIG. 1 shows an example environment including a vehicle including a system for tracking objects through occluded regions according to embodiments described herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code) or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" refers to a set of computer-readable programming instructions, as executed by a processor, that cause the processor to perform one or more specified function(s).

The term "vehicle," or other similar terms, refers to any motor vehicle, powered by any suitable power source, capable of transporting one or more passengers and/or cargo. The term "vehicle" includes, but is not limited to, autonomous vehicles (i.e., vehicles not requiring a human operator and/or requiring limited operation by a human operator, either onboard or remotely), automobiles (e.g., cars, trucks, sports utility vehicles, vans, buses, commercial vehicles, class 8 trucks, etc.), boats, drones, trains, and the like.

The term "autonomous vehicle," "automated vehicle," "AV," or "driverless vehicle," as used herein, refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle. Autonomous vehicles may be any type of vehicle including, but not limited to, cars, trucks, motorcycles, busses, recreational vehicles, agricultural vehicles, construction vehicles etc. According to various embodiments, autonomous vehicles may include a throttle control system and a braking system. Autonomous vehicles may include one or more engines and/or one or more computing devices. The one or more computing devices may be separate from the automated speed control system or the braking system. Additionally, the computing device may include a processor and/or a memory. The memory may be configured to store programming instructions that, when executed by the processor, are configured to cause the processor to perform one or more tasks. In certain embodiments, autonomous vehicles may include a receiver configured to process the communication between autonomous vehicles and a teleoperation system.

The term "trajectory" or "map" is used broadly to include, for example, a motion plan or any path or route from one place to another; for instance, a path of travel of an anticipated object such as a pedestrian as she/he crosses a street from one side to the other side of a street.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute these modules to perform one or more processes that are described further below.

Further, the control logic of the present disclosure may be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media may be stored and executed in a distributed fashion such as, e.g., by a telematics server or a Controller Area Network (CAN).

Unless specifically stated or obvious from context, as used herein, the term "about" is understood as within a range of normal tolerance in the art. The function of the object described having an approximate feature ("about") can be determined by a person of skill in the art based on the normal tolerances for such part, the object or function of the part, the position and relation to other objects or parts of the invention, and other information as would be used by a person of skill in the art. As an example, about may be within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for tracking one or more objects in occluded regions within a vehicle environment and adjusting or maintaining driving instructions for the vehicle in response to the tracked objects in the occluded regions will be described with reference to the accompanying drawings, according to embodiments of the present disclosure.

Exemplary embodiments include methods and systems to adjust a driving path in a planner-map, including: identifying a driving surface; determining a path on the driving surface; identifying one or more objects relative to the driving surface using one or more sensors; detecting one or more occlusion areas from sensor data from the one or more sensors; tracking one or more tracks of one or more objects within the one or more occlusion areas; adding uncertainty to the one or more tracks within the one or more occlusion areas; and adjusting the path on the driving surface based on the uncertainty of the one or more tracks within the one or more occlusion areas.

Referring now to FIG. 1, an example sensor-equipped vehicle 105 on a roadway 110 is provided, in accordance with various embodiments of the present disclosure.

According to various embodiments, the vehicle 105 may comprise one or more sensors such as, for example, one or more LiDAR sensors 115, one or more radio detection and ranging (RADAR) sensors 120, one or more cameras 125, and/or one or more ultrasonic transducers 145, among other suitable sensors. According to various embodiments, the one or more sensors may be in electronic communication with one or more computing devices 130. The one or more computing devices 130 may be separate from the one or more sensors and/or may be incorporated into the one or more sensors. The vehicle 105 may comprise a LiDAR system which may comprise one or more LiDAR sensors 115 and/or one or more computing devices 130. The vehicle 105 may comprise a camera system which may comprise one or more cameras 125 and/or one or more computing devices 130.

In the example of FIG. 1, the LiDAR sensor 115 may be configured to emit light directed to strike a surface (e.g., the roadway 110, one or more obstacles 150, rain, snow, etc.) within the environment of the vehicle 105.

According to various embodiments, the one or more obstacles 150 may comprise one or more objects, one or more geographic hindrances to travel, and/or one or more other suitable obstacles 150. According to various embodiments, the one or more obstacles 150 may comprise one or more pedestrians 155, one or more vehicles 160, 162, one or more pieces of vegetation 165, and/or one or more other suitable obstacles 150.

Once the light emitted from the LiDAR sensor 115 comes into contact with the surface, the light is deflected. Some of the deflected light may be reflected to bounce back to the LiDAR sensor 115. The LiDAR sensor 115 may be configured to measure data pertaining to the light bounced back (for example, the distance traveled by the light, the length of time it took for the light to travel from and to the LiDAR sensor 115, the intensity of the light returning to the LiDAR sensor 115, and so on as understood by a person of ordinary skill in the art). This data may then be used to generate a point cloud (i.e., data points, in a coordinate system, that represent locations of obstacles within an environment) of some or all of the environment around the vehicle 105, generally recreating an object map of the road surface of the roadway 110, obstacles 150 within the environment, and so on.

According to various embodiments, the LiDAR sensor 115 may be coupled to the vehicle 105 and/or may be configured to generate one or more point clouds of an environment surrounding the vehicle 105. The environment may fully surround the vehicle or may encompass a portion of the vehicle's 105 surroundings. According to various embodiments, the LiDAR sensor 115 may be in electronic communication and/or coupled to the one or more cameras 125.

According to various embodiments, one or more obstacles 150 may be occluded from view of vehicle 150 by one or more other obstacles 150. For example, as shown in FIG. 1, pedestrian 155 may be occluded from view by vegetation 165, and vehicle 162 may be occluded from view by vehicle 160.

Occlusion may occur in a variety of scenarios after an obstacle has been detected by the one or more sensors of the vehicle 105. A smaller obstacle may be occluded by a larger obstacle. For example, smaller obstacles, such as, e.g., pedestrians 155, bicycles, motorcycles, etc. may move behind a larger obstacle, in relation to the vehicle 105, a larger obstacle may move in front of the smaller obstacle, in relation to the vehicle 105, and/or the vehicle 105 may move, causing a larger obstacle to be positioned between the smaller obstacle and the vehicle 105. In each of these scenarios, when an obstacle becomes occluded, the one or more sensors coupled to the vehicle 105 may no longer be able to track the occluded obstacle. An occlusion may also occur when an object is no longer within a field of view of one or more sensors of the vehicle. For example, the sensors 115, 120, 125, 145 may define a field of view 170 of detection and tracking for the vehicle 105. The vehicle 105 may be able to detect the vegetation 165 until the vehicle 105 passes the vegetation and the vegetation 165 passes out of the field of view 170 of the sensors. Therefore, an occlusion may occur whenever an object can no longer be tracked by a vehicle or may be harder to be tracked by a vehicle, such as in areas of no or weak perception by the one or more sensors of the vehicle.

When an obstacle becomes occluded, the obstacle does not disappear. The occluded object may still be relevant in safely and efficiently navigating an environment and preventing possible collision with the occluded obstacle and/or one or more other obstacles.

In an exemplary embodiment, the vehicle 105 may include an object detection and analysis system 175 for detecting and classifying objects in a vicinity of the vehicle. Object detection and analysis may be performed by methods such as those shown and described by applications of Applicant, co-pending herewith, including, for example: U.S. patent application Ser. Nos. 18/065,417; 18/065,419; 18/065,421, filed Dec. 13, 2022; and U.S. patent application Ser. No. 18/062,228, filed Dec. 6, 2022, each of which are incorporated herein in their entirety. After an object is detected and classified, the object may be tracked as it remains in a field of view of one or more sensors 115, 120, 125, 145 of vehicle 105. However, a detected object may become occluded and no longer detected by the combinations of sensors of the vehicle. Exemplary embodiments of the system 175 of tracking occluded objects for path planning may be configured to continue to track or estimate a trajectory of the occluded object in order to continue to account for the object in the path planning of the autonomous vehicle. Exemplary embodiments of the system 175 may also or alternatively identify occlusions created by areas not observable by sensors (whether because of an obstruction caused by an object or by the positional configuration of the one or more sensors).

According to various embodiments, the computing device 130 may comprise a processor 135 and/or a memory 140. The memory 140 may be configured to store programming instructions that, when executed by the processor 135, are configured to cause the processor 135 to perform one or more tasks such as, e.g., defining a map of a driving area, identifying a driving surface, determining a path on the driving surface, determining a driving path on the map of the driving area, identifying driving lanes on the map of the driving area, detecting one or more obstacles 150, tracking the one or more obstacles 150, determining one or more occlusion areas on the map and/or in relation to the vehicle or other reference frame, determining whether the one or more obstacles 150 are occluded, creating one or more object tracks for the one or more objects, determining whether the one or more object racks enter the one or more occlusion areas, maintaining the one or more object tracks in the one or more occlusion areas, dropping the one or more object tracks from the occlusion area under predefined circumstances as described herein, creating a probably of an occluded object location while the one or more objects are within one or more occlusion areas, updating the probably of the occlusion object location as the object remains occluded, determining an uncertainty of a predicted location of an occlusion object within the one or more occlusion areas, determine a driving path of a vehicle, change or update a driving path of the vehicle based on the occlusion areas and/or the tracks maintained within the occlusion areas, determining one or more vehicle actions, performing one or more vehicle actions, among other functions, and combinations thereof.

As described herein, different functional parts may be used to perform the one or more functions described and claimed herein. For example, a planner-map may be configured to identify a driving surface and determine a path on the driving surface, sensor(s) for generating sensor data of objects and driving areas detection, detector(s) for identifying one or more objects, driving areas, lanes, or other attributes from the sensor data generated from the sensor(s), occlusion publisher for detecting one or more occlusion areas using information from the sensor(s) and/or detector(s), tracker for maintaining one or more tracks/trajectories for the one or more objects, planner (or planner-map) configured to determine a driving path of a vehicle, change or update a driving path of the vehicle based on the occlusion areas and/or the tracks maintained within the occlusion areas, and/or determine one or more vehicle actions. These functional parts are shown and described as separate components as an exemplary embodiment for ease of explanation. The functional parts may be separate combinations of components, such as separate processor(s), memor(y/ies), and programing instructions. However, the functional parts may be integrated into the same combination of processor(s), memor(y/ies), and programming instructions. Therefore, the present invention disclosure covers the combinations of system components in which these functions are integrated and/or separated into any number of component parts from a single processing system to multiple processing systems that communicate with each other to perform the system functions described herein. In addition, if a claimed component is claimed to perform more than one function, the system may actually have more than one component part performing the different functions, and the group of the component parts are understood to be the claimed component performing the claimed functions. For example, a planner-map may be configured to generate a map of the driving surface, as well as determine a driving path through the map. The planner-map may actually be configured as a mapping device to generate the map, and a planner to generate the driving path. The combination of the planner and the map device are considered in combination to be the planner-map.

Figures 2, 4:
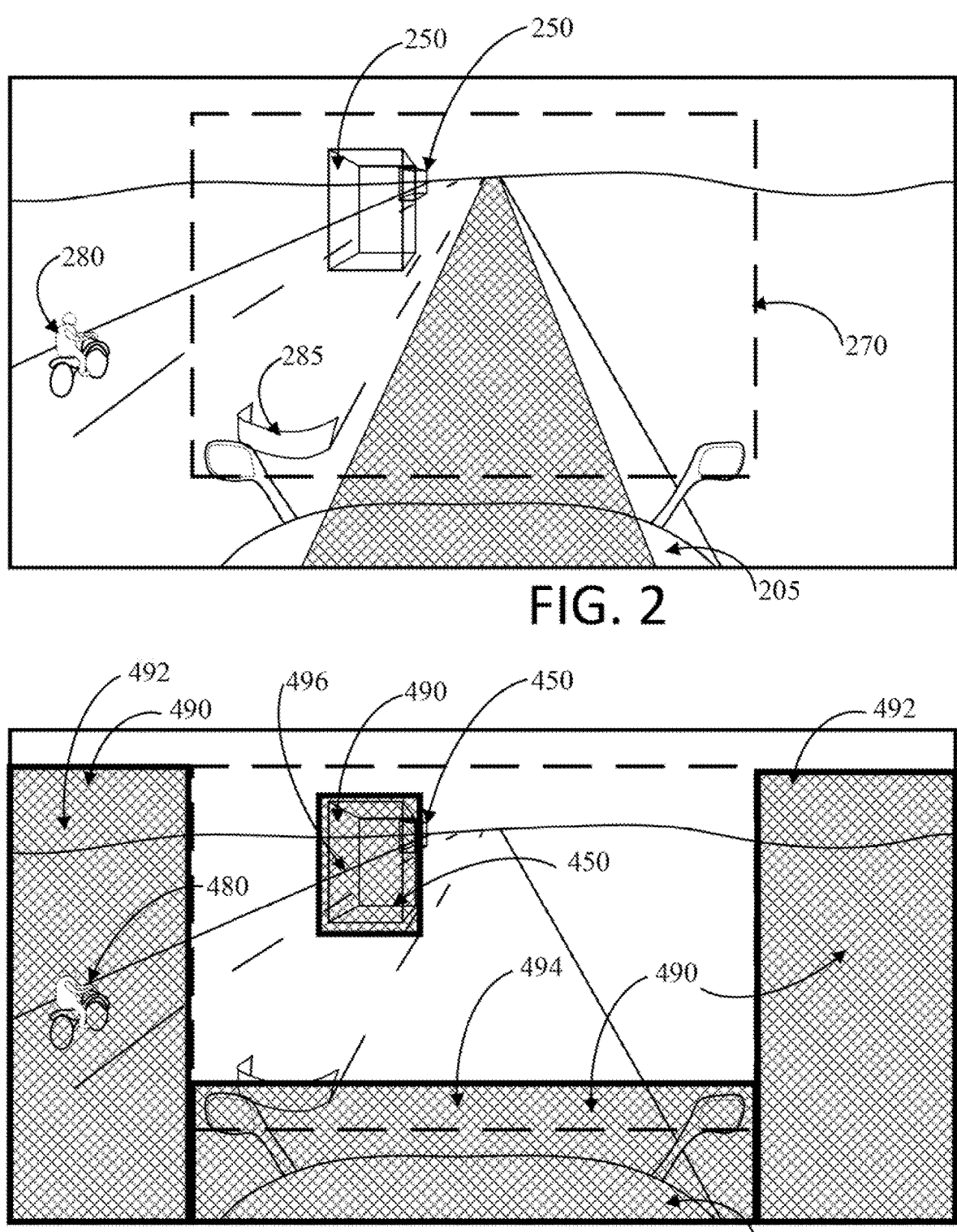
FIG. 2 is an example view of an environment from a vehicle including a system for tracking objects through occluded regions according to embodiments described herein.
FIG. 4 illustrates an exemplary obstruction map according to exemplary embodiments of the present disclosure overlaid on the view of the environment of FIG. 2.

FIG. 2 illustrates an exemplary image of an environment in front of a vehicle 205. The environment may be analyzed to detect one or more obstacles 250 within the field of view 270 of one or more sensors. As illustrated, the detected objects 250 are illustrated as cubes covering the volume in which the obstacles encompasses. The obstacles may, for example, be other vehicles.

It can be imaged from the scene of FIG. 2 situations in which one or more objects may become occluded as described herein. For example, the motorcycle 280 may have been detected in a field of view of one or more sensors, such as from a rear or side of the vehicle 205, but is not yet in the field of view 270 of the forward facing sensors. Accordingly, the motorcycle 280 may be within a zone that is not detected or may only be weakly detected by the one or more sensors. The motorcycle 280 may, therefore, be considered as occluded, or otherwise outside the detection of one or more sensors. However, the motorcycle 280 still exists and should be relevant to the path planning of the vehicle 205 during any autonomous vehicle path implementations. As another example, as the motorcycle continued to travel, it may enter the field of view 270 but be occluded by one or more of the other objects 250 if their relative speeds put the motorcycle 280 behind another object. Other examples of field of view limits of one or more sensors may cause an object to be occluded. For example, a fender 285 from an accident or other debris on the road may end up getting dropped from detection as it approaches the vehicle 205 because of limitations of the near field, field of view.

In an exemplary embodiment of the present disclosure, an occlusion is understood to occur when an object cannot be detected by the combination of sensors because it is obscured from the sensor(s) by another object that is detected by the combination of sensors. An occlusion is understood to also or alternatively occur when an object cannot be detected by the combination of sensors because it is outside the field of view of the combination of sensors, either in the far field or the near field. An occlusion is understood to also or alternatively occur when an object may pass between regions of sensors and is within a dead zone or area proximate to the vehicle that is not detected by the combination of one or more sensors of the vehicle. In an exemplary embodiment, the obstruction occurs when the obstructed object is within a proximity to the vehicle 205 so that its presence is relevant to the determinations of path planning of an autonomous vehicle.

Figure 3A:
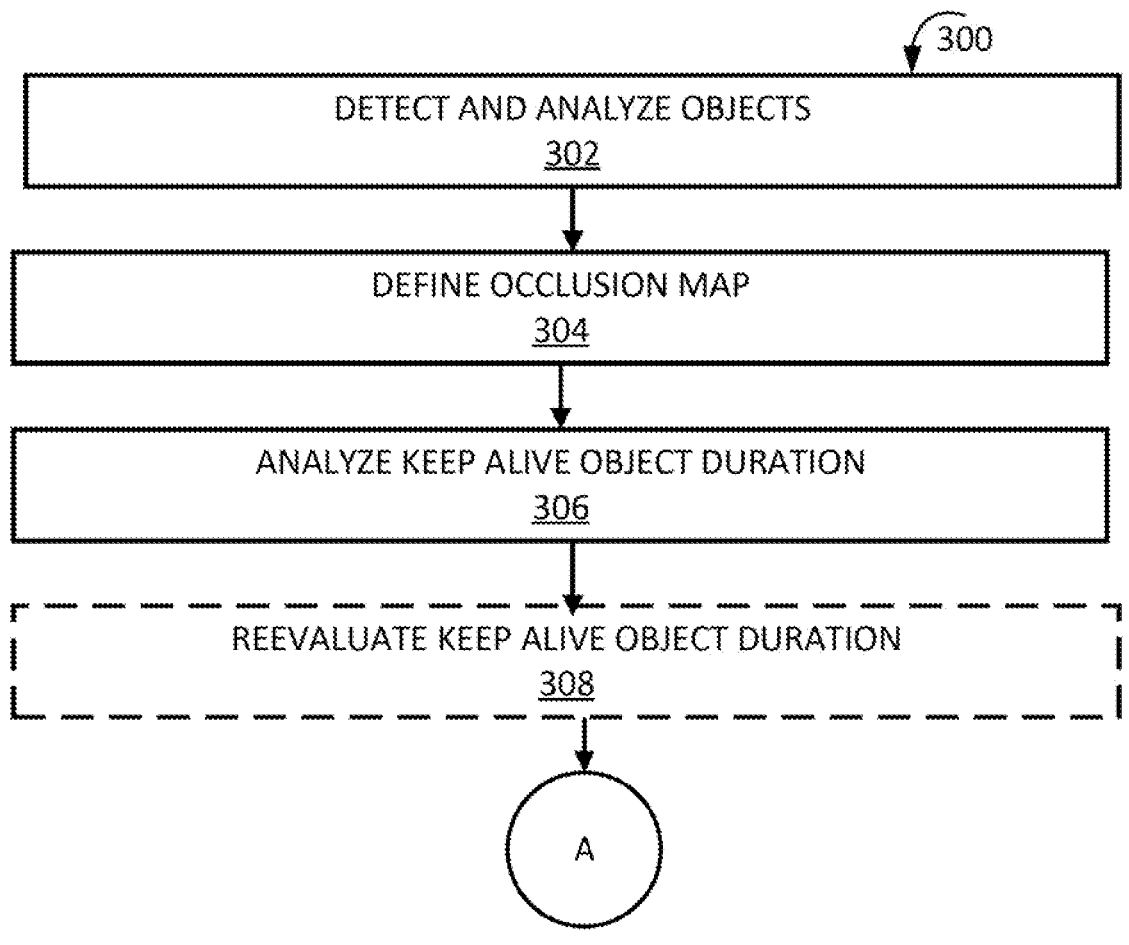
FIGS. 3A-3B are an example flowchart of a method for tracking objects through an occluded area, according to various embodiments of the present disclosure.
Figure 3B:
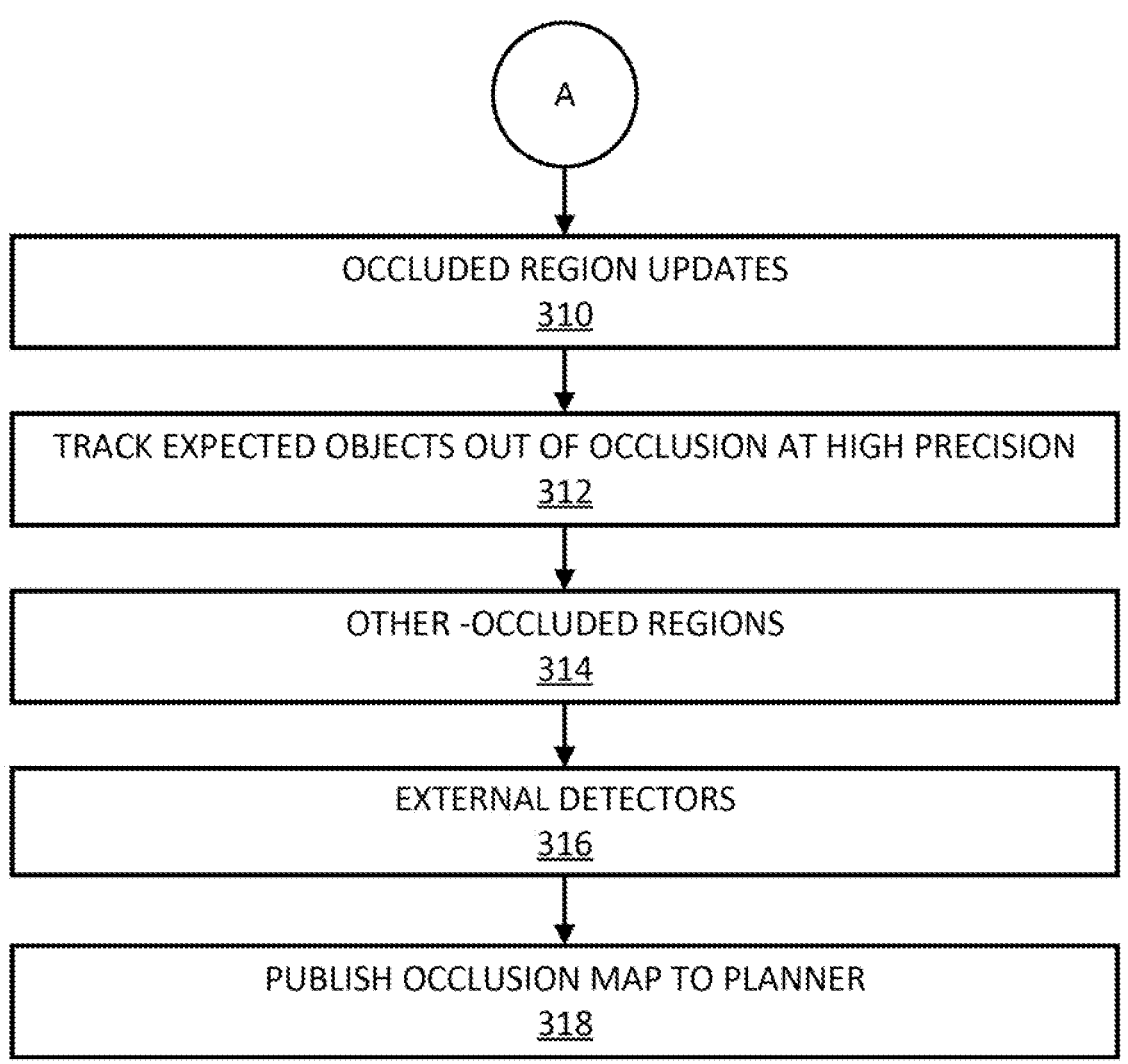

FIGS. 3A-3B illustrate exemplary methods 300 of tracking occluded objects for path planning for an autonomous vehicle.

At step 302, the method may start by detecting and analyzing objects to determine relevant objects within the field of one or more sensors of the vehicle. Relevant objects may be those that are in proximity of the vehicle that a person of skill in the art would consider relevant to the path planning of the vehicle during autonomous control. The objects may be classified and tracked for analysis and estimations of any path planning for the vehicle when autonomously driven.

At step 304, an occlusion map may be defined. The occlusion map may be defined based on an area of interest around the vehicle in which objects should continue to be tracked even if occluded. The occlusion map may be defined based on limitations of the field of view of the combination of sensors, and/or other limitations of the detected area around the vehicle based on the sensor(s) position and orientation around the vehicle. For example, an occlusion map may include blind spots created by the combination of sensors and/or may include additional space from the vehicle in areas that are relevant to path determinations of the vehicle. The occlusion map may be pre-defined and coded into the system. The occlusion map may therefore be static in time. In an exemplary embodiment, the occlusion map may be dynamically determined based on the environment, detected scene, and/or detected objects. For example, the occlusion map may be increased to encompass curves in the road or objects in a proximity of the vehicle anticipating potential obstructions caused by the detected environment and/or conditions. The occlusion map may therefore be updated to account for the detected objects and/or environment that do or could cause obstructions within a proximity of the vehicle.

At step 306, the method may include setting an initial keep alive time. For example, the system may start with a predefined keep alive duration. The keep alive duration may be a defined amount of time in which an object is tracked once it is no longer detected by the sensor(s) of the vehicle. The keep alive time may be, for example, 1 second. Other durations are also possible, such as from more than zero seconds to up to 10 seconds, 30 seconds, or more. Once the keep alive time lapses, starting from when the object becomes occluded, the object is no longer tracked by the system and the occluded object is not considered in the path planning during autonomous vehicle decisions.

The method may then analyze conditions of the occlusion and/or of the occluded objects to determine whether the keep alive time should be adjusted. For example, the system may determine when an object is occluded. The system may detect whether conditions are present related to the occlusion to determine if the keep alive time should be modified to keep the object track for a longer amount of time. For example, the system may determine a trajectory of the occluded object based on previous positions of the detected object. If the determined trajectory of the occluded object is within the occlusion map, the system may be configured to update the keep alive time for that occluded object. The system may consider other factors, such as if the object is occluded by another object, the proximity of the occluded object to the vehicle when it was occluded, the direction of travel of the occluded object when it was occluded, the relative position of the occluded object to the vehicle (such as if the occluded object is behind, to the side of, or in front of the vehicle), the anticipated or expected trajectory of the occluded object, whether the occluded object is stationary or moving, current estimated position relative to the vehicle, or any combination thereof to determine whether the occluded object stay alive time should be increased or if the object should continued to be tracked.

At step 308, the method may optionally re-evaluate the keep alive time of the occluded object. For example, the system may detect whether the object has been un-occluded, such as being detected by one or more sensors of the vehicle. The keep alive for the occluded object may be terminated, as the object is being directly tracked again. The system may also detect whether other conditions may exist in which the occluded object may no longer be tracked. For example, if the occluded object was behind another object (an obscuring object), and neither the occluded object or the obscuring object are detected (or the obscuring object was detected as leaving the field of view of the sensors of the vehicle outside of the occlusion map so that it moved far enough away from the vehicle to be relevant to the path), the system may determine that the occluded object is no longer relevant to the path planning of the autonomous vehicle and may terminate the keep alive of the occluded object. If the obscuring object is still detected, but the occluded object is not, the system may increase the keep alive time or may maintain the obstructed object to continue to track an expected trajectory.

The system may also employ a confidence evaluation to assess whether the occluded object is still relevant to the path planning of the vehicle for autonomous control. The confidence level of the occluded object may diminish over time. The confidence level described herein may also be considered an uncertainty because the object is not directly detected by the one or more sensors. The system may determine an expected position of the obstructed object based on the trajectory of the obstructed object when it was detected. The system may determine an expected trajectory of the obstructed object (track) based on the trajectory of the obstructed object when it was detected. The system may determine a confidence level (uncertainty) based on the passage of time and/or on the determinations of the expected position and trajectory based on the detected data of the obstructed object when it was not occluded. The system may determine based on these factors an updated keep alive time for the occluded object. For example, if the expected trajectory of the occluded object is expected to take the occluded object far enough away from the vehicle within an estimated time, the keep alive time may be updated to an amount of time at or beyond the estimated time (or may be set to zero once the amount of time has elapsed). An another example, if the expected trajectory of the occluded object determines that an occluded object may still be behind another object (an obscuring object), then the occluded object keep alive time may be updated. However, as time passes, the confidence that the occluded object is still behind the obscuring object may diminish, and eventually, the system may determine that the object should no longer be tracked so that the keep alive time is reduced or terminated.

In exemplary embodiments, the method may terminate or may continue with other occluded objects. The occluded object may then be tracked for the duration of the keep alive time or the duration of the updated keep alive time if/when it is re-evaluated.

Although described herein as a "keep alive time", the system is not limited to only a count-down timer from the given timer before a track is cleared from the occlusion areas. The "keep alive time" may also be considered as a presumption in which the tracks are simply maintained in the system until certain conditions are met, including, for example, and combination of determining the object creating the track has left the occlusion area, the object is detected again by one or more sensors, the occlusion area is no longer present in the sensors field of view, the occlusion area is no longer in a proximity to the vehicle that the tracks within the occlusion area are relevant (or as relevant) to vehicle path planning, etc. Therefore, a "keep alive time" essentially is infinite and terminates or is set at zero when the condition is met, even though an actual data structure for "time" is not stored in the system.

In an exemplary embodiment, the system may not include or adjust a keep alive time. Instead, the system may instead simply analyze whether the object should continue to be tracked, even as it resides (or is estimated to reside) in the occlusion areas. In this case, the system may still consider the same conditions, but instead of adjusting the stay alive time, determine whether the occluded object should continue to be tracked or not.

In an exemplary embodiment, if the system determines that the keep alive time should be adjusted or the occluded object should continue to be tracked, the keep alive time may be set to an adjusted keep alive duration. The adjusted keep alive duration may be infinite (or until the vehicle is no longer driving or on), may be infinite until the obstructed object is detected again, or may be set to a maximum value, such as 10 minutes, 15 minutes, 30 minutes, a hour, etc.

In an exemplary embodiment, the method may proceed as illustrated in FIG. 3B. The steps shown and described with respect to FIG. 3B may be used in any combination with the features described with respect to FIG. 3A. For example, only step 312, including increasing the precision of objects leaving an area corresponding to the occlusion map may be implemented, while the other steps are not. Multiple steps may be implemented together as well, such as, for example including 312, 314, and 316 with the steps of FIG. 3A.

At step 310, the method may optionally proceed by implementing occluded region updates. Therefore, for occluded objects (objects in the areas of the occlusion map), the system may be configured to adjust the tracks of the objects and/or account for the uncertainties that relate to the continued existence of the track as it remains in the occlusion areas and not directly tracked by the one or more sensors. For example, the system may analyze different other information about the occlusion area and/or events related or around the occlusion area. The tracks of objects within the occlusion area may then be updated if the tracks are likely influenced by something else, such as another object entering the occlusion area. As another example, the system may incorporate an uncertainty into the track of an object within the occlusion area. The uncertainty may be used to account for possible variability of the track of the occluded object as the occluded object remains in the occlusion area. For example, as the object enters an occlusion area, the track of the object close to the time of entry into the occlusion area will be known with more certainty as the object is likely to continue based on the information just before entering the occlusion area. However, as the object remains in the occlusion area, the position becomes less known because the object may change directions, change speed, etc. The system may therefore track an uncertainty associated with the object so that the variability in its predicted location may be taken into account. In an exemplary embodiment, the variability or uncertainty may be accounted for by widening or increasing an area associated with a predicted location of the object. For example, at time zero, when the object enters the occlusion area, its predicted location may be determined with a high level of certainty. At time 10, however, the object may have stopped, changed direction, or changed speed. The predicted location or track of the occluded object may therefore include a band or region in which the object is considered to be within. The predicted location may include anywhere from where the object entered, including anywhere along the trajectory generated from when the object entered the occlusion area, or may include anywhere radiated out from such a location (to account for variations in direction). In an exemplary embodiment, the system may therefore maintain a track of the occluded object in which the track is not a narrow trajectory (or may start as a narrow trajectory but does not stay a narrow trajectory) but an area the propagates out from the point the object entered the occlusion area, and over time expands over the occlusion region propagating from the entry location across the occlusion area. Over time, or after a duration (that may be a predetermined amount of time or based on the information related to the object sensed before or as it enters the occlusion area) the system may define a measurement or path in which the occluded object is considered to be uniformly present within the occlusion area. Essentially, the system no longer knows where in the occlusion area the object may be. The occluded object may be considered trapped in the occlusion area. Therefore, if an object enters an occluded region and is not observed to exit the occluded region, then every update on a periodic basis may evidence that the object is still in the occluded region. Over time, the system may not know where it is in the occluded region. The object may be "measured" anywhere in that contiguous region of the occlusion area. In an exemplary embodiment, the posterior state estimate may be a mixture of a prior position with an uncertainty measurement. As the object enters the region, the system is still confident in it's state (low uncertainty), but as the object remains in the occluded region longer, the system's uncertainty grows to fill the region—the system knows it is in there, but are less sure exactly where. In an exemplary embodiment, when the object is observed again, or as the object exits the occlusion area, the system becomes more or very confident about where it is and can update its state with lower uncertainty.

At step 312, the method may include tracking objects with a higher precision that are detected entering, leaving, and/or in a certain proximity to areas associated with the occlusion map. The objects in proximity or adjacent to areas of the occlusion map may be observed with higher precision. These objects adjacent to the area of the occlusion map may be more precisely detected so that information about an object going into or out of the occlusion map may be known with greater details. The higher precision may be used to compare objects going into and out of the areas of the occlusion map to determine whether the object(s) are the same object or different. The higher precision may be used to reduce false positives of tracks moving out of areas of the occlusion map so that obstructed objects are not removed from tracking (their keep alive duration terminated) when they are still obstructed. Higher precision may include considering additional details of the object, using faster sampling rates, higher image processing to determine greater details, obtaining more information to create more accurate trajectory estimations, or other characteristics in analyzing the detected objects from the one or more sensors. For example, for a person, the system may include tracking hair color, hair length, clothes, cloth colors, gender, height, weight, etc. when the person is going into or leaving an area associated with the occlusion map or while in an areas adjacent to areas of the occlusion map. However, when the person is away from areas of the occlusion map, the person may be identified only as an object, a person, or an object to be avoided, and the specific attributes of the person are not determined or analyzed. "Higher" is understood to be a relative term compared to the processing of the images and/or data from the one or more sensors between two areas, such as those areas adjacent the areas of the occlusion map and those areas away from the areas of the occlusion map.

At step 314, the method may optionally include analyzing different occlusion maps or integrated occlusion maps into a single occlusion map. For example, there may be obstructions created by the sensor configurations, the conditions of the sensors, the environment (or scenery), other objects, etc. The method may include analyzing occluded objects based on the different occlusion maps or by integrating the occlusion maps before analyzing the occluded object. In an exemplary embodiment, the system may first analyze an first occlusion map based on the vehicle (and/or sensor/detector) setup including unmonitored areas and/or sensor/detector limitations. The system may be configured to then analyze a second occlusion map based on the environment, such as caused by scenery and/or other detected objects within the environment of the vehicle.

At step 316, the method may include using other sensors and/or detectors to determine a status of an occluded object and/or to update the keep alive duration of the occluded object. For example, the system may be configured to determine that an object went into an area associated of the occlusion map. After a predefined duration, the system may determine that the occluded object has not left the area of the occlusion map. The system may interrogate additional sensors or receive additional data in order to determine whether the occluded object is still in or likely still in or out or likely out of the area of the occlusion map. In an exemplary embodiment, the system may be communicate with other systems or external detectors to receive additional data about object in the area of the occlusion map to confirm the presence or absence of occluded object within the area of the occlusion map.

At step 318, the occlusion map may be shared with the planner. The planner may be configured to perform the path planning as described herein for the autonomous vehicle. The planner may therefore use the occlusion map in order to make decisions and/or updates about a path of the vehicle. For example, the occlusion map may be used to inform the planner that information within the occlusion map are unknown or known with certain levels of uncertainty or with less certainty. The planner may therefore use this information to make decisions that avoid traveling into areas of the occlusion map. The planner may therefore consider or optimize interactions of an entire environment in which areas of the scene may be hidden by occlusions occurring within the occlusion map. The planner may also consider areas in which objects are likely to exit and occlusion area to avoid those areas, and/or be ready to react to those situations as they may happen.

Exemplary embodiments of the methods described herein may result in a tunable keep alive time that permits the system to remember or track an occluded object for a longer amount of time. Exemplary embodiments may be used to track objects continuously around the vehicle more easily. Exemplary embodiments may be used to consider occlusion areas as defined by the occlusion map. Creating and/or tracking an occlusion map may be used for understanding what parts of the environment are positively seen or directly detected and for which areas of the environment create corridor problems or if object may be hidden behind other objects. Exemplary embodiments may be used to keep track of objects that follow a vehicle but may be hidden from the sensors of the vehicle, such as when a trailer is being pulled by the vehicle or other occlusion scenario that is not currently accounted for in detecting objects around a vehicle.

Exemplary embodiments may be used to define occlusion areas in any proximity or relative position to the vehicle. For example, occlusion areas may include obstructions in the vertical direction above or about the vehicle. In an exemplary embodiment, an occlusion may be generated from an on ramp off ramp, overpass, overhanging items, etc.

In an exemplary embodiment, the occlusion map can be a voxel grid in three dimensions or a pixel grid in two dimensions. Exemplary embodiments described herein may be used so that the planner can generate worst case planning or actuate cautiously to preserve the ability to detect and avoid obstacles if such worst case is happening when the an occluded objects is exposed by exiting the occlusion.

In an exemplary embodiment, a method may maintain tracking of an object that passes into an occluded area, including define a map of a driving area; define one or more occlusion areas within the map; detect an object using sensor data from one or more sensors; create an object track for the object detected using sensor data; determine that the object track entered one of the one or more occlusion areas; maintain the object track while the object track remains in the one or more occlusion areas.

In an exemplary embodiment, the method may include maintaining and/or dropping the object tracks based on one or more criteria, including, for example: the object track may be maintained while the object remains undetected by the one or more sensors; dropping the object track when the one of the one or more occlusion areas are cleared; dropping the object track when the object exits the one of the one or more occlusion areas by detecting the object with the one or more sensors; dropping the object track when a probably that the object is no longer in one or more occlusion areas has surpassed a threshold.

In an exemplary embodiment, the method may include maintaining and/or updating a probability location of the one or more tracked objects in the occlusion areas (including the one or more object tracks). For example, the method may include any combination of: determining a probability location of an object tracked in the occlusion area; determining a certainty of the probability location manifests in an area of probability in which the object may be within the one or more occlusion areas along the object track; determine the probability location with less certainty the longer the object remains in the one or more occlusion areas, wherein the less certainty results in a larger areas of probability associated with the object along the object track.

In an exemplary embodiment, the method may adjust a driving path in a planner-map, and may include identifying a driving surface; determining a path on the driving surface; identifying one or more objects relative to the driving surface using one or more sensors; detecting one or more occlusion areas from sensor data from the one or more sensors; tracking one or more tracks of one or more objects within the one or more occlusion areas; adding uncertainty to the one or more tracks within the one or more occlusion areas; adjusting the path on the driving surface based on the uncertainty of the one or more tracks within the one or more occlusion areas.

The method may include managing track(s) of objects within the occlusion areas including updating the tracks with uncertainty to account for the unknown position of the object within the occlusion area. For example, the method may include any combination of: the uncertainty of the one or more tracks is based on a time elapse of an object corresponding to the track that is within the one or more occlusion areas, the uncertainty of the one or more tracks increases as time elapses, the uncertainty is based on a size of the one or more occlusion areas, the uncertainty increases with the size of the one or more occlusion areas, the path is adjusted based on the one or more tracks within the one or more occlusion areas.

In an exemplary embodiment, the method may adjust a driving path of a vehicle, including identifying a driving surface; determining a path on the driving surface; identifying one or more objects relative to the driving surface using one or more sensors; determining one or more occlusion areas created by the one or more objects; adding uncertainty of a potential additional object within the one or more occlusion areas; adjusting the path on the driving surface based on the uncertainty of the potential additional object within the one or more occlusion areas.

In an exemplary embodiment, the method may remove tracks from a tracker when the tracks are within an occluded region. The method may include defining a map of a driving area; defining an occlusion area within the map; detecting an object using sensor data from one or more sensors; determining that the object entered the occlusion area; creating an estimated object location for the object within the occlusion area.

The method may include many combinations of additional or alternative features. For example, the method may include any combination of: dropping the estimated object location for the object when the occlusion area is cleared; the occlusion area is cleared when an occluding object creating the occlusion area is no longer occluding the one or more sensors; the occlusion area is cleared when the object is detected by the one or more sensors after leaving the occlusion area; increasing a precision of observation for objects leaving the occlusion area; increasing a precision of observation for objects entering the occlusion area; using the increased precision of observation for objects entering and leaving the occlusion area to confirm that the object entering the occlusion area is the same as the object leaving the occlusion area before dropping the estimated object location for the object when the occlusion areas is cleared; updating the map of the driving area to include estimates of the driving area within the occlusion area; the estimates of the driving area may be an extension of lane detections; periodically updating the estimated object location to an updated estimated object location for the object while the object remains in the occlusion area; the updated estimated object location may be increased in area as time elapses from when the object entered the occlusion area; the updated estimated object location increases to fill the occlusion area; create a keep alive duration for the object entering the occlusion area configured to retain a tracking of the object within the occlusion area for the keep alive duration; adjusting the keep alive duration based on an estimated trajectory of the object in the occlusion area, and a time elapsed from when the object entered the occluded area; dropping the estimated object location for the object when the occlusion area is cleared is by updating the keep alive duration to zero.

FIG. 4 illustrates an exemplary occlusion map according to embodiments described herein. As illustrated, an exemplary occlusion map 490 may be determined based on areas that are outside of the detection of the sensor(s) of the vehicle, i.e dead zones 492, may include areas of reduced visibility or detection, i.e. near field 494, or may be occluded by one or more objects, i.e. obstructions 496.

An occlusion map may be defined as the areas of an environment that are not detected by or not well detected by one or more sensors of the vehicle. The far field limitations of the combination of sensors may be excluded from the occlusion map as objects far enough away from the vehicle may be of little relevance to the path planning of the autonomous vehicle, and therefore do not require objects within this space to continually be tracked. In an exemplary embodiment, the occlusion map may be defined as the areas within a proximity of the vehicle that are also without or with limited detection by one or more combination of sensors for detecting objects around the vehicle. For example, the occlusion map may be defined based on an area of interest around the vehicle in which objects should continue to be tracked even if occluded. The occlusion map may be defined based on limitations of the field of view of the combination of sensors, or other limitations of the detected area around the vehicle based on the sensor(s) position and orientation around the vehicle. For example, an occlusion map may include blind spots created by the combination of sensors and/or may include additional space from the vehicle in areas that are relevant to path determinations of the vehicle. The occlusion map may be predefined and coded into the system. The occlusion map may therefore be static in time. In an exemplary embodiment, the occlusion map may be dynamically determined based on the environment, detected scene, and/or detected objects. For example, the occlusion map may be increased to encompass curves in the road or objects in a proximity of the vehicle anticipating potential obstructions caused by the detected environment and/or conditions. The occlusion map may therefore be updated to account for the detected objects and/or environment that do or could cause obstructions within a proximity of the vehicle.

In an exemplary embodiment, an occlusion map may comprise multiple occlusion maps. The multiple occlusion maps may be considered together, such as integrated into a single occlusion map or may be analyzed separately. A first occlusion map may be defined by the sensor configuration of the vehicle. For example, a first occlusion map may be based on the sensor limitations, such as dead zones 492 or near field limits 494. The first occlusion map defined by the sensor configuration and/or sensor limitations may be a static, pre-defined occlusion map. One or more second occlusion maps may be defined by the detection of one or more objects. Each object may create its own occlusion map or the obstructions created by a plurality of objects may be integrated to define a single occlusion map. Accordingly, as second occlusion map may be defined by detected objects 450 within an environment within a proximity of the vehicle.

In an exemplary embodiment, obstructions created by transitory objects may be analyzed separately. Therefore, an object such as obstruction 496 may obstruct another object 450 such as another vehicle. Both objects may be used to define an occlusion map. However, if the occlusion maps from the separate objects are combined, then the second object that is illustrated as coming out from behind the first object would still be considered within an occlusion, although it is no longer occluded but in fact causing the occlusion. Accordingly, the systems and methods described herein may also include the locations of objects and when determining whether an object is an occluded object by comparing it to one or more occlusion maps, the system may determine whether the object itself has defined the occlusion area within the occlusion map. Alternatively or in addition thereto, different occlusion maps may be defined by each/ different object, and the object defining an occlusion map is not compared to the occlusion map in which the object defined, but only with other occlusion maps from other objects.

Figure 5:
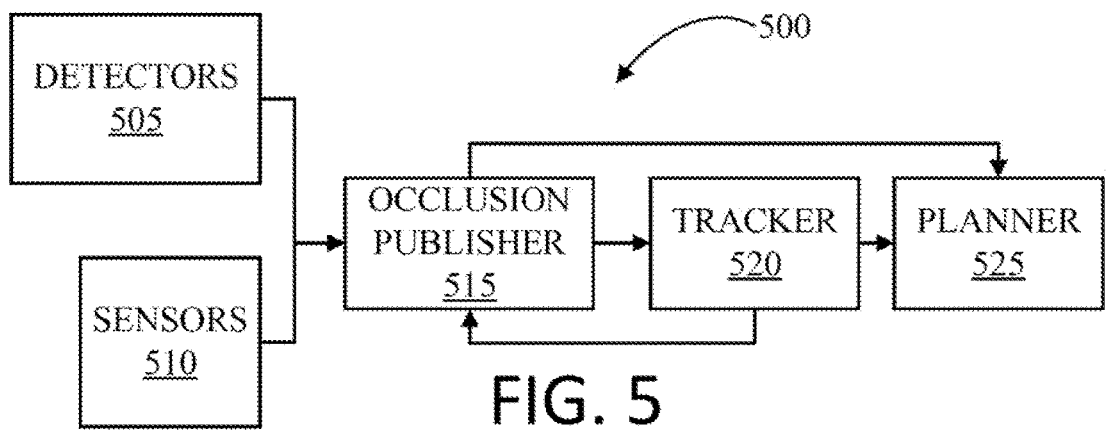
FIGS. 5-6 illustrate example architectures for tracking objects through an occluded area according to various embodiments of the present disclosure.

FIG. 5 illustrates a block diagram of an exemplary architecture of an exemplary system according to embodiments described herein. As illustrated, the exemplary system may include and/or may be configured to receive information from one or more sensors 505 that may include detectors 505 for detecting objects from the sensor data. The system may include an occlusion publisher 515, and tracker 520. The system may include and/or may be configured to communicate with a planner 525.

Exemplary embodiments of the detectors 505 and/or sensors 510 may include devices in which attributes of objects and/or the environment around a vehicle may be detected. According to various embodiments, the detectors/ sensors may include any combination of LiDAR, RADAR, one or more cameras, one or more ultrasonic transducers, or other suitable devices for generating data and/or analyzing the data to determine information about objects or the environment around the vehicle.

Data from the one or more detectors and/or sensors may be fed into an occlusion publisher. Data from the one or more detectors and/or sensors may include occlusion maps of the individual sensor. For example, each detector may determine a field of view of a sensor. The different field of view(s) or areas in which the sensors are blind may be provided to the occlusion publisher. The data from the one or more sensors may include objects determined by the detector that may be considered by the occlusion publisher as an obstacle to define part of the occlusion map. The sensor/detector may be separate components in which data is generated and then analyzed or may be integrated into a single component in which data is generated and analyzed to detect objects. As used here, sensor and/or detector and/or sensor/detector may include a device that is configured to generate data such as obtaining information from or about an environment, and/or may include analyze data to determine an attribute about the data, such as detecting objects within the data.

In an exemplary embodiment, architecturally, the occlusion map may be constructed by integrated data from each detector to determine what each sensor observes/detects. For example, the occlusion publisher 515 may be configured to define one or more occlusion maps from the information (whether analyzed or raw) from the one or more detectors 505/sensors 510. The occlusion publisher 515 may determine an occlusion map per detector 505/sensor 510, may integrate occlusion maps to create a unified or universal occlusion map or may define a combination of occlusion maps.

Exemplary embodiments may include different types of occlusions. An exemplary occlusion map may include any combination of: (1) vehicle footprint—the footprint of the vehicle as occluded based on the pose footprint over a time window; (2) no-sensor regions around the vehicle—the areas within a proximity of the vehicle in which there is no data received by the combination of sensors of the vehicle; (3) occluded regions caused by objects/obstacles—the areas defined through ray tracing from one or more sensors behind a detected object in which the one or more sensors cannot detect additional objects; (4) environmental conditions that may cause obstructions—this may include hills, curves, curbs, overpasses, columns, dividers, etc.

Exemplary embodiments may include defining an occlusion publisher as a global occlusion detector that may be configured to create a unified occlusion map that comprises a unification of one or more of the occlusion maps and/or as created by the global occlusion detector and/or one or more other components, such as the separate detectors/sensors. The occlusion publisher 515 may be configured to create and/or maintain one or more occlusion maps as described herein. The one or more occlusion maps may include any combination of statically defined maps and/or dynamically defined or detected maps.

Architecturally, the occlusion detector may be considered as a detector that is configured to handle all the tracks at every cycle and can update the respective keep alive times. In this example, the system can update other parts of the state over time (e.g. distributions, probability of existence, etc.).

Exemplary embodiments of the occlusion publisher 515 may be configured to receive and/or handle the track states of obstructed objects to manage keep alive times of those obstructed objects. For example, the occlusion publisher 515 may receive track states of obstructed objects from the tracker at the end of every tracker cycle and manage the keep alive times for each of the obstructed objects and their associated tracks. The occlusion publisher 515 may be configured to communicate with the tracker 520 to provide information to the tracker 520 including one or more of the occlusion maps, keep alive times, and/or tracks of occluded objects.

In an exemplary embodiment, the tracker 520 is configured to receive information from the occlusion publisher 515. The tracker 520 may be configured to maintain one or more tracks/trajectories, locations, uncertainty, or any combination thereof of one or more objected identified by the system. The occlusion publisher is a detection that happens to determine "what regions can the system see?" The tracker (object tracker) is a detection that happens to determine "where is the stuff in the world". The tracker may be configured to use the information from the occlusion publisher (reasoning about where the system can see) to estimate the occlusion at any point in time. Since occlusion(s) may change over time as motion occurs, the occlusion may be temporal in nature. The system may see this occlusion at t0 and the occlusion at t1 so it is tracked over time. The tracker then consumes this occlusion temporal information in order to reason about object track updates. In an exemplary embodiment, the tracker may be configured to extinguish tracks that have exceeded their keep alive times.

Figure 6:
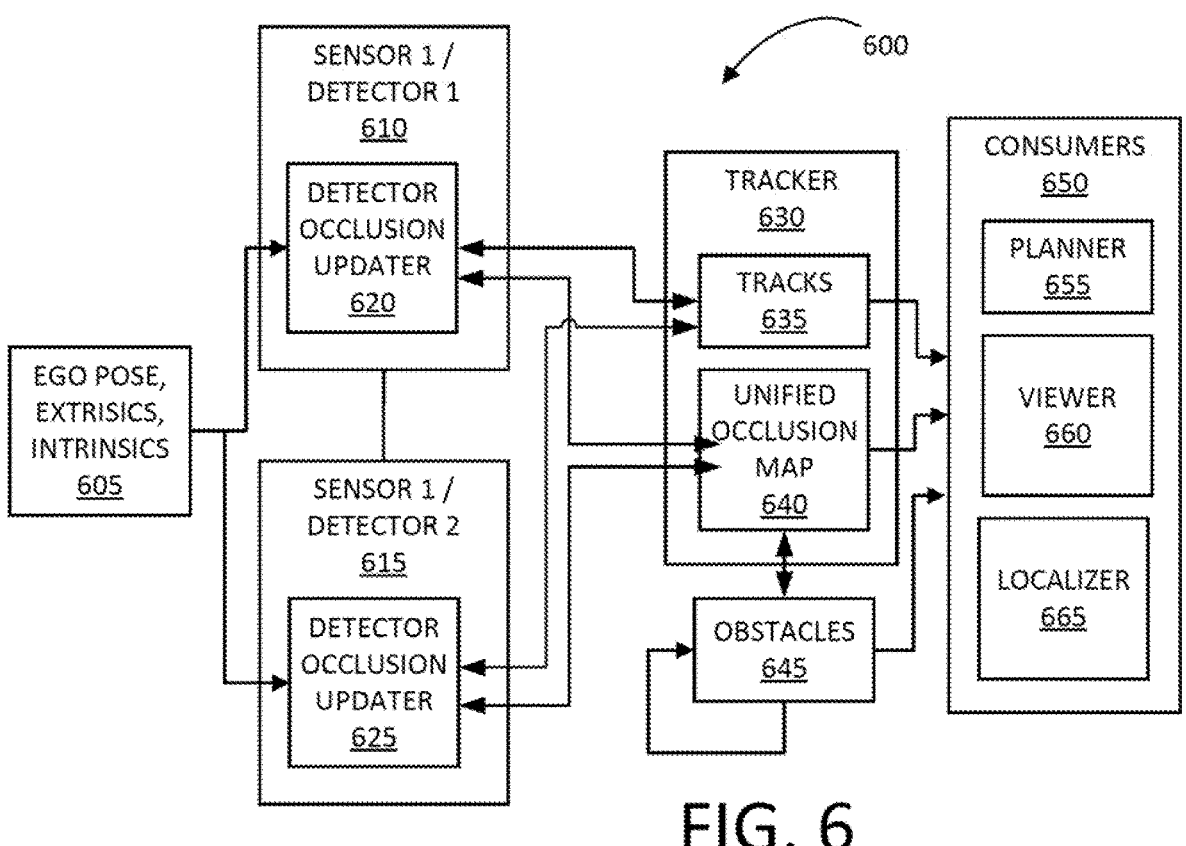

FIG. 6 illustrates an exemplary architecture of a system according to embodiments for tracking through occluded regions as described herein.

As illustrated, the system for tracking objects through occluded regions 600 may include one or more detectors/sensors, 610, 615 and tracker 630.

As illustrated, a first detector/sensor 610 and a second detector/sensor 615 are illustrated. Although two detectors/sensors are shown, any combination of detectors/sensors may be used. The detectors may receive information 605. Each detector 610, 615 may include an occlusion updater 620, 625. The detector occlusion updater 620, 625 may be configured to create an occlusion map based on the detector 620, 625. Each detector may therefore determine a field of view of the detector/sensor and/or detect one or more objects within the field of view of the detector/sensor. The detector may then be configured through the detector occlusion updater to define an occlusion map based on the range of the detector/sensor and/or what is detected by the detector.

In an exemplary embodiment, each detector 610, 615 may optionally track and/or update track states within its own occlusion regions. Each detector 610, 615 may optionally track and/or update track states within its own occlusion region that is created by objects detected by the detector.

In an exemplary embodiment, each detector determines its own area of occlusion based on a world state. Exemplary embodiments may be configured so that each detector 610, 615 is aware of its word state, such as by receiving information 605. The received information 605 may include the vehicle pose, sensor extrinsics/intrinsics, tracks, and obstacles. Each detector 610, 615 may be configured to associate objects detected by that detector to a track. If an object is detected without a track, then the detector may create a new track. The detectors may determine which tracks no longer have a detection (i.e., a previously identified/detected object is no longer detected/identified). If a track no longer has a detection, the detector may be configured to determine whether the track entered an occlusion region. If the track is determined to have entered an occlusion region, then an occlusion region may be assigned to the track. An elapse time of a keep alive time may be started for the track in the occlusion.

In an exemplary embodiment, for each track, the detector may compute the intersection over a track area. As described herein, the detector may be configured for each track to determine a predicted location or trajectory within the occlusion area. The predicted location or trajectory may include an uncertainty to include a possible variability of the possible location of the object as it remains in the occlusion area. In an exemplary embodiment, the detector may therefore maintain a track of the occluded object in which the track is not a narrow trajectory (or may start as a narrow trajectory but does not stay a narrow trajectory) but an area the propagates out from the point the object entered the occlusion area, and over time expands over the occlusion region propagating from the entry location across the occlusion area. Over time, or after a duration (that may be a predetermined amount of time or based on the information related to the object sensed before or as it enters the occlusion area) the detector may define a measurement or path in which the occluded object is considered to be uniformly present within the occlusion area. Essentially, the detector no longer knows where in the occlusion area the object may be. The occluded object may be considered anywhere in the occlusion area. Therefore, if an object enters an occluded region and is not observed to exit the occluded region, then every update on a periodic basis may evidence that the object is still in the occluded region. Over time, the detector may not know where it is in the occluded region. The object may be "measured" as anywhere in that contiguous region of the occlusion area.

In an exemplary embodiment, the occlusion map may be a bird's eye view (BEV) binary image. The computation for a given track may be performed on a pixel image.

In an exemplary embodiment, the intersection measurement of each track may be made when the detector has information to add, such as when the track is near the interface of an occlusion according to the detector. The distance may be computed by a distance transform on the occlusion map.

An occluded region may be defined by identifying all areas of a detector that are occluded. For example, a detector may define an area within its field of view. All bird eye view (BEV) cells inside the field of view (FOV) of the detector can be coded as un-occluded; then, regions behind objects as detected by the detector can be defined as occluded within a margin around the object.

The system 600 may be configured such that the one or more detectors 610, 615 communicate with a tracker 630. The tracker 630 may be configured to determine and/or maintain position of objects and/or determine expected trajectories of objects (tracks 635). The tracker 630 may also and/or alternatively be configured to maintain keep alive times for respective tracks 635 according to embodiments described herein. The tracker may therefore be configured with instructions for determining keep alive times or updating keep alive times as described herein. The tracker may also or alternatively be configured to track the elapse time of an occluded object from the time the occluded object became occluded. The tracker may also or alternatively be configured to determine a confidence score in the location, trajectory, and/or presence of an occluded object.

In an exemplary embodiment, the tracker 630 may also or alternatively be configured to receive the information from the one or more detectors 610/615 to generate a unified occlusion map 640.

As described herein, the detector is shown and described as maintaining the tracks of detected objects from a sensor. However, the tracker may also keep or maintain this information. The tracker may receive information from the detectors and maintain an amalgamated system of tracks. The received information may be raw data of a sensor or analyzed information from a detector. The detector may provide any or all of the track functions described herein and/or the tracker may perform any or all of the track functions described herein. The tracker and/or detector may therefore work together or replace one or the other.

As described herein, obstacles 645 are also detected in order to identify possible occlusions and generate an occlusion map 640.

The system 600 may be configured such that the tracker communicates with consumers 650. The consumers 650 may include one or more separate and/or integrated objects that receive information from the tracker and use it to perform its own function. For example, the planner 655 may be used to determine a path for controlling the autonomous vehicle. The viewer 660 may display information about the vehicle, including blind spots. The localizer 665 may be configured to track the places detected by the one or more detectors/sensors. The localizer 665 may be configured to identify areas of uncertainty where a road may be located. The localizer may be configured to use the occlusion(s) or occlusion map to reason about a vehicle's corridor state, and its update. When the localizer cannot see a region and thus receives no lane detections in such region, the localizer is configured not to update the lanes as "not there", but instead, the localizer is configured to reason about them in the same way as objects and maintain its existence as if it went into an occlusion. Uncertainty grows, but the estimated location of the lanes do not move since they are static and the last time the system detected them was when the occlusion started. The localizer may also have a similar function as the occlusion to predict a situation in which the system "has not seen this region ever" so the system can plan cautiously in recognition of this fact.

Exemplary embodiments described herein may be used by the planner 665 for predicting behavior of occluded objects. Exemplary embodiments described herein may be used by the planner for planning, such as in planning a path or speed of the vehicle in response to objects that are no longer observable.

An exemplary embodiment of the system and method for tracking objects through occluded regions, may include 1. Keepalive: set a keep alive duration in each track state.
2. Empty occlusion grid: Publish an empty Occlusion Grid from an occlusion generator inside the tracker in local coordinates that may be similar to an obstacle grid.
3. Grid visualizer: Visualize this grid in the viewer.
4. Use grid: Use this empty grid to update keepalive durations near the end of each tracker cycle.
5. Define area around the vehicle as occluded: At every frame of the generator, define a locally observed region that is not seen this cycle. For a simple implementation, this may be a region around the vehicle and may include the vehicle footprint. In an exemplary embodiment, the footprint may include a distance to include obstruction objects, such as a trailer. For example, a distance (such as 10 m) to each side of the vehicle pose may be defined only where the tractor is, a second distance (such as 10 m) behind the rear of the trailer, and a third distance (such as 10 m) ahead of the front bumper.
6. Memory for preserving occluded obstacles between frames: an occlusion grid may be generated in the obstacle detector and maintain memory of the last cycle obstacles. Use the Grid to keep obstacles alive as the obstacle reside in the occluded region around the vehicle.
7. Update keepalives for vulnerable type objects: the occlusion grid in the tracker may be used to decide on different keep alive durations. In an example, the occlusion grid may be used to compute the keep alive duration for every track. When an object is in the occluded region, the keep alive duration (TTL) may be set to a predefined amount (such as 2 second, 3 seconds, or more). In an exemplary embodiment, the keep alive time is increased when an object enters an occlusion region. The keep alive time may be based on the classification of the object, such as for pedestrians verses vehicles. When an obstacle comes back out of an occlusion region, the keep alive time may be reset, such as lowered to a predetermined amount (such as 1 second, 2 seconds, or more). In an exemplary embodiment, current time and last detection time may be also or alternatively used to compute a keep alive duration. In an exemplary embodiment, the keep alive time may be set all tracks that are update every cycle depending on where it is, what class it is, and when it was last observed.

As described herein, the vehicle may include a planner. The planner may be configured to identifying one or more one or more objects (such as pedestrians, vegetation, vehicles, or other obstacles) within the environment of the vehicle. The planner may be configured to determine a control attribute of the vehicle for autonomous driving. As described herein, the control attribute may be any of a speed, a change in speed, a direction, a path, or other control of the vehicle. The planner may comprise one or more computing devices and/or may be a component of one or more computing devices.

According to various embodiments, the system described herein may comprise one or more sensors including, for example, LiDAR sensors, RADAR sensors, camera sensors, etc. The one or more sensors may be coupled to the vehicle and/or may be positioned at any suitable position or positions along a vehicle (e.g., the front, sides, back, top, bottom, etc.).

According to various embodiments, the camera sensor(s) may be in electronic communication with one or more image processors configured to detect objects within the image and/or classify the object, for example, as a pedestrian, a vehicle, vegetation, etc.

A combination of shape and color may be used in the classification of one or more obstacles. According to various embodiments, one or more of the image detectors may be configured to query one or more color features for each point of a patched and/or full image. Although the shape of vehicles and vegetation might be similar, color features may be very strong representations which may be used to distinguish them.

According to various embodiments, the classified obstacles may be sent downstream to one or more planning modules. The one or more planning modules may be configured to plan a trajectory of the vehicle, including any changes in direction, velocity, etc. According to various embodiments, the one or more planning modules may incorporate high precision data from the environment of the vehicle. The high precision data from the environment of the vehicle may be gathered, calculated, and/or determined via one or more high precision perceived environment modules.

An exemplary system described herein may be configured to maintain tracking of an object that passes into an occluded area. The system may include detection system configured to define a map of a driving area; one or more sensors configured to generate sensor data; a detector configured to detect an object from the sensor data; an occlusion publisher configured to define one or more occlusion areas within the map; a tracker configured to create an object track for the object detected by the detector and configured to maintain the object track when the object is determined to enter the one or more occlusion areas.

Exemplary embodiments of the system may include any combination of the following features: a tracker configured to drop the object track when the occlusion region is cleared; a tracker configured to drop the object track when the object exits the one of the one or more occlusion areas by detecting the object with the one or more sensors; a tracker configured to drop the object track when a probably that the object is no longer in one or more occlusion areas has surpassed a threshold; a tracker configured to update a probability location of the object while the object remains undetected by the one or more sensors and within the one or more occlusion areas; a tracker is configured to define a certainty of the probability location and manifest the certainty as an area of probability in which the object may be within the one or more occlusion areas along the object track; a tracker is configured to determine the probability location with less certainty the longer the object remains in the one or more occlusion areas; a tracker is configured to define a reduction in the certainty as a larger areas of probability associated with the object along the object track.

Exemplary embodiments described herein include a system to adjust a driving path of a vehicle. The system may include a planner-map configured to identify a driving surface and determine a path on the driving surface; one or more sensors configured to generate sensor data to identify one or more objects relative to the driving surface; an occlusion publisher configured to detect one or more occlusion areas from the sensor data from the one or more sensors; a tracker configured to track one or more tracks of one or more objects within the one or more occlusion areas, wherein the planner-map is configured to add uncertainty of the one or more tracks of one or more objects within the one or more occlusion areas, and adjust the path on the driving surface based on the uncertainty of the one or more tracks within the one or more occlusion areas.

The system may also or alternatively include any combination of additional features, such as, for example: a planner-map configured to add the uncertainty of the one or more tracks based on a time elapse of an object corresponding to the track that is within the one or more occlusion areas; a planner-map configured to increase the uncertainty of the one or more tracks as time elapses; a planner-map is configured to add the uncertainty based on a size of the one or more occlusion areas; a planner-map is configured to increase the uncertainty with the size of the one or more occlusion areas; a planner-map is configured to adjust the path based on the one or more tracks within the one or more occlusion areas.

Exemplary embodiments described herein may include a system to remove tracks from a tracker when the tracks are within an occluded region. The system may include a planner-map configured to identify a driving surface and determine a path on the driving surface; one or more sensors configured to generate sensor data to identify one or more objects relative to the driving surface; an occlusion publisher configured to detect one or more occlusion areas from the sensor data from the one or more sensors; a tracker configured to determine that the object entered the occlusion area; wherein the planner-map is configured to create an estimated object location for the object within the occlusion area, and drop the estimated object location for the object when the occlusion area is cleared. The system (such as through the planner-map) may also or alternatively be configured to clear the occlusion area when an occluding object creating the occlusion area is no longer occluding the one or more sensors, and/or clear the occlusion area when the object is detected by the one or more sensors after leaving the occlusion area.

Figure 7:
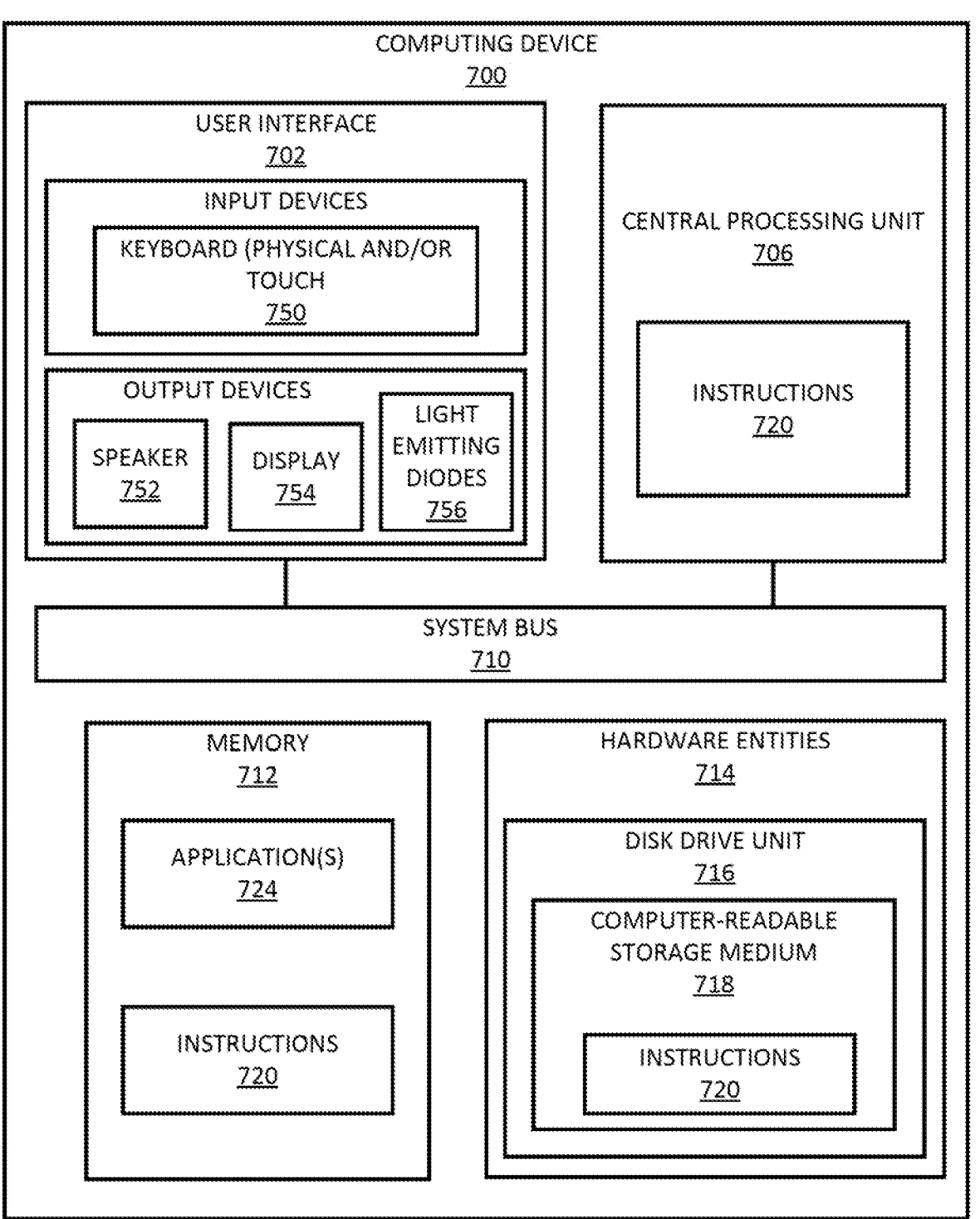
FIG. 7 illustrates example elements of a computing device, according to various embodiments of the present disclosure.

Referring now to FIG. 7, an illustration of an example architecture for a computing device 700 is provided. The computing device 130 of FIG. 1 may be the same as or similar to computing device 700. As such, the discussion of computing device 700 is sufficient for understanding the computing device 130 of FIG. 1, for example.

Computing device 700 may comprise greater or fewer components than those shown in FIG. 1. The hardware architecture of FIG. 7 represents one example implementation of a representative computing device configured to one or more methods and means for tracking objects through an occluded area within a vehicle environment, and determining a course of action for the vehicle, as described herein. As such, the computing device 700 of FIG. 7 implements at least a portion of the method(s) described herein (for example, method 300 of FIGS. 3A-3B).

Some or all components of the computing device 700 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the computing device 700 comprises a user interface 702, a Central Processing Unit ("CPU") 706, a system bus 710, a memory 712 connected to and accessible by other portions of computing device 700 through system bus 710, and hardware entities 714 connected to system bus 710. The user interface can include input devices and output devices, which facilitate user-software interactions for controlling operations of the computing device 700. The input devices include, but are not limited to, a physical and/or touch keyboard 750. The input devices can be connected to the computing device 700 via a wired or wireless connection (e.g., a Bluetooth® connection). The output devices include, but are not limited to, a speaker 752, a display 754, and/or light emitting diodes 756.

At least some of the hardware entities 714 perform actions involving access to and use of memory 712, which can be a Random Access Memory (RAM), a disk driver and/or a Compact Disc Read Only Memory (CD-ROM), among other suitable memory types. Hardware entities 714 can include a disk drive unit 516 comprising a computer-readable storage medium 718 on which is stored one or more sets of instructions 720 (e.g., programming instructions such as, but not limited to, software code) configured to implement one or more of the methodologies, procedures, or functions described herein. The instructions 720 can also reside, completely or at least partially, within the memory 712 and/or within the CPU 706 during execution thereof by the computing device 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

Figure 8:
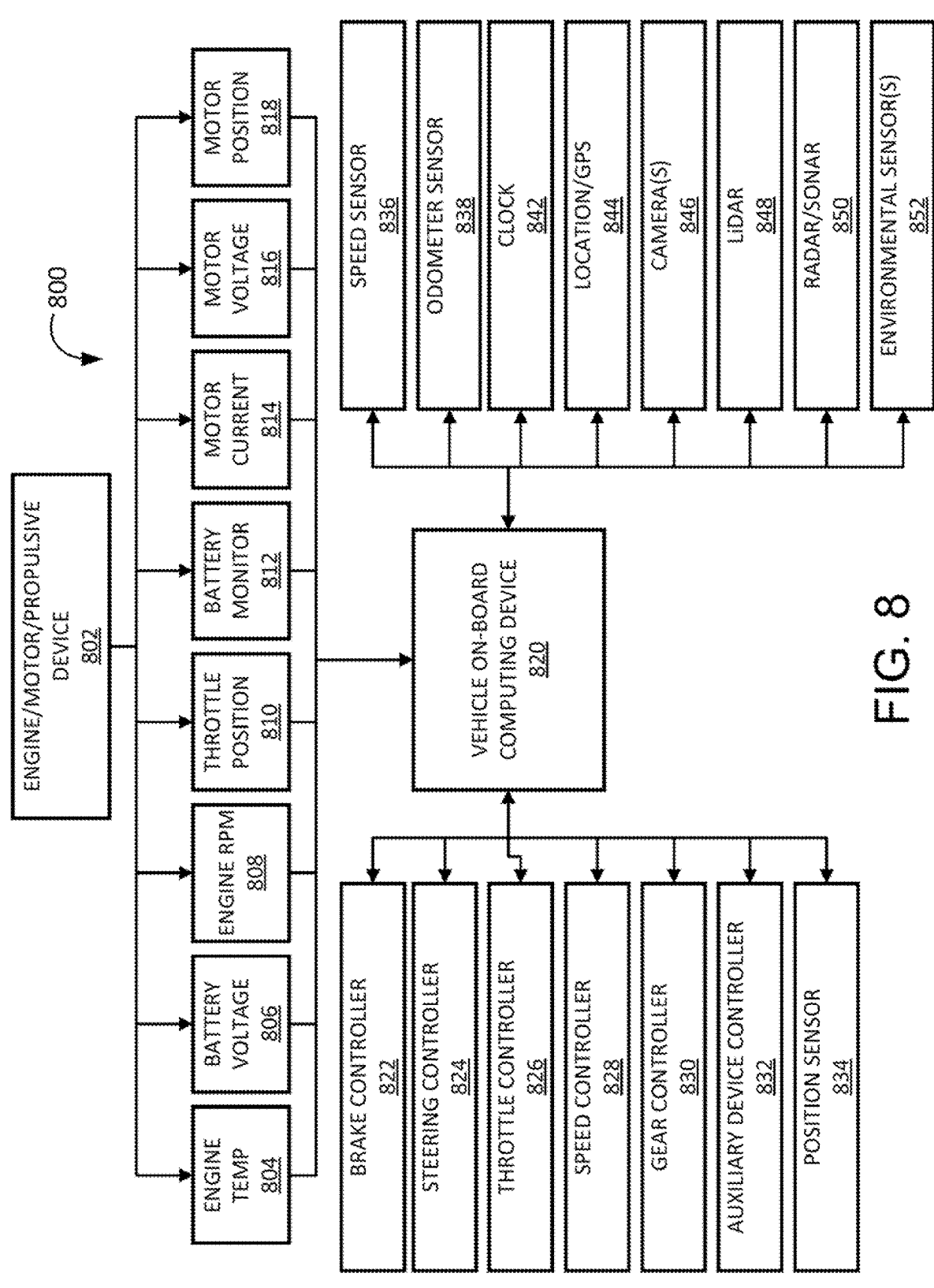
FIG. 8 shows example architecture of a vehicle, according to various embodiments of the present disclosure.

Referring now to FIG. 8, example vehicle system architecture 800 for a vehicle is provided, in accordance with various embodiments of the present disclosure.

Vehicle 105 of FIG. 1 can have the same or similar system architecture as that shown in FIG. 8. Thus, the following discussion of vehicle system architecture 800 is sufficient for understanding vehicle 105 FIG. 1.

As shown in FIG. 8, the vehicle system architecture 800 includes an engine, motor or propulsive device (e.g., a thruster) 802 and various sensors 804-818 for measuring various parameters of the vehicle system architecture 800. In gas-powered or hybrid vehicles having a fuel-powered engine, the sensors 804-818 may include, for example, an engine temperature sensor 804, a battery voltage sensor 806, an engine Rotations Per Minute (RPM) sensor 808, and/or a throttle position sensor 810. If the vehicle is an electric or hybrid vehicle, then the vehicle may have an electric motor, and accordingly will have sensors such as a battery monitoring system 812 (to measure current, voltage and/or temperature of the battery), motor current 814 and voltage 816 sensors, and motor position sensors such as resolvers and encoders 818.

Operational parameter sensors that are common to both types of vehicles include, for example: a position sensor 834 such as an accelerometer, gyroscope and/or inertial measurement unit; a speed sensor 836; and/or an odometer sensor 838. The vehicle system architecture 800 also may have a clock 842 that the system uses to determine vehicle time during operation. The clock 842 may be encoded into the vehicle on-board computing device 820, it may be a separate device, or multiple clocks may be available.

The vehicle system architecture 800 also may comprise various sensors that operate to gather information about the environment in which the vehicle is traveling. These sensors may include, for example: a location sensor 844 (for example, a Global Positioning System (GPS) device); object detection sensors such as one or more cameras 846; a LiDAR sensor system 848; and/or a radar and/or a sonar system 850. The sensors also may comprise environmental sensors 852 such as a precipitation sensor and/or ambient temperature sensor. The object detection sensors may enable the vehicle system architecture 800 to detect objects that are within a given distance range of the vehicle 800 in any direction, while the environmental sensors 852 collect data about environmental conditions within the vehicle's area of travel.

During operations, information is communicated from the sensors to an on-board computing device 820. The on-board computing device 820 may be configured to analyze the data captured by the sensors and/or data received from data providers, and may be configured to optionally control operations of the vehicle system architecture 800 based on results of the analysis. For example, the on-board computing device 820 may be configured to control: braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 844 to the on-board computing device 820, which may then access a map of the environment that corresponds to the location information to determine known fixed features of the environment such as streets, buildings, stop signs and/or stop/go signals. Captured images from the cameras 846 and/or object detection information captured from sensors such as LiDAR 848 is communicated from those sensors to the on-board computing device 820. The object detection information and/or captured images are processed by the on-board computing device 820 to detect objects in proximity to the vehicle. Any known or to be known technique for making an object detection based on sensor data and/or captured images may be used in the embodiments disclosed in this document.

Exemplary embodiments described herein include a vehicle having a system for tracking objects through an occlusion as described herein.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method to adjust a driving path in a planner-map, comprising:

detecting, using a computing device and sensor data from one or more sensors coupled to a vehicle, an environment of the vehicle, wherein the computing device comprises a processor and a memory;

identifying, using the computing device, a driving surface within the environment of the vehicle based on the sensor data;

determining, using the computing device, a path on the driving surface on which the vehicle may travel, based on the sensor data from the one or more sensors;

identifying, using the one or more sensors, one or more objects relative to the driving surface;

detecting, using the computing device, one or more occlusion areas within the environment of the vehicle based on the sensor data from the one or more sensors;

tracking, using the one or more sensors, one or more tracks of one or more objects within the one or more occlusion areas;

adding, using the computing device, an uncertainty value to each of the one or more tracks within the one or more occlusion areas;

adjusting, using the computing device, the path on the driving surface based on the uncertainty value of the one or more tracks within the one or more occlusion areas; and performing, using the computing device, one or more driving actions to cause the vehicle to follow the path on the driving surface.

2. The method of claim 1, wherein the uncertainty value of each of the one or more tracks is based on a time that has elapsed during which an object, corresponding to a track that is within the one or more occlusion areas, is within the one or more occlusion areas.

3. The method of claim 2, wherein the uncertainty value of the one or more tracks increases as time elapses.

4. The method of claim 1, wherein the uncertainty value is based on a size of the one or more occlusion areas.

5. The method of claim 4, wherein the uncertainty value increases with the size of the one or more occlusion areas.

6. The method of claim 1, wherein the path is adjusted based on the one or more tracks within the one or more occlusion areas.

7. The method of claim 1, wherein the one or more driving actions comprise one or more of the following: accelerating the vehicle; braking the vehicle; and steering the vehicle.

8. A system to adjust a path, comprising:

a vehicle;

one or more sensors coupled to the vehicle configured to record sensor data of an environment of the vehicle; and a computing device, comprising a processor and a memory, wherein the memory is configured to store instructions that, when executed by the processor, are configured to cause the processor to:

detect, based on the sensor data, the environment of the vehicle;

identify a driving surface within the environment of the vehicle;

determine a path on the driving surface on which the vehicle may travel, based on the sensor data from the one or more sensors;

identify, using the one or more sensors, one or more objects relative to the driving surface;

detect one or more occlusion areas within the environment of the vehicle based on the sensor data from the one or more sensors;

track, using the one or more sensors, one or more tracks of one or more objects within the one or more occlusion areas;

add an uncertainty value to each of the one or more tracks within the one or more occlusion areas;

adjust the path on the driving surface based on the uncertainty value of the one or more tracks within the one or more occlusion areas; and perform one or more driving actions to cause the vehicle to follow the path on the driving surface.

9. The system of claim 8, wherein the uncertainty value of each of the one or more tracks is based on a time that has elapsed during which an object, corresponding to a track that is within the one or more occlusion areas, is within the one or more occlusion areas.

10. The system of claim 9, wherein the instructions, when executed by the processor, are further configured to cause the processor to increase the uncertainty value of the one or more tracks as time elapses.

11. The system of claim 8, wherein the uncertainty value is based on a size of the one or more occlusion areas.

12. The system of claim 11, wherein the instructions, when executed by the processor, are further configured to cause the processor to increase the uncertainty value with the size of the one or more occlusion areas.

13. The system of claim 8, wherein the adjusting the path on the driving surface comprises adjusting the path based on the one or more tracks within the one or more occlusion areas.

14. The system of claim 8, wherein the one or more driving actions comprise one or more of the following: accelerating the vehicle; braking the vehicle; and steering the vehicle.

15. A method to adjust a driving path in a planner-map, comprising:

detecting, using a computing device and sensor data from one or more sensors coupled to a vehicle, an environment of the vehicle, wherein the computing device comprises a processor and a memory;

identifying, using the computing device, a driving surface within the environment of the vehicle based on the sensor data;

determining, using the computing device, a path on the driving surface on which the vehicle may travel, based on the sensor data from the one or more sensors;

identifying, using the one or more sensors, one or more objects relative to the driving surface;

detecting, using the computing device, one or more occlusion areas within the environment of the vehicle formed by the one or more objects;

adding, using the computing device, an uncertainty value of a potential additional object within the one or more occlusion areas;

adjusting, using the computing device, the path on the driving surface based on the uncertainty value of the potential additional object within the one or more occlusion areas; and performing, using the computing device, one or more driving actions to cause the vehicle to follow the path on the driving surface.

16. The method of claim 15, wherein the one or more driving actions comprise one or more of the following: accelerating the vehicle; braking the vehicle; and steering the vehicle.

* * * * *